United States Patent [19]

Kato

[11] 4,196,589
[45] Apr. 8, 1980

[54] HYDRAULIC CIRCUIT FOR STEERING AND FRONT BRAKE SYSTEM

[75] Inventor: Yoshiaki Kato, Fuchu, Japan

[73] Assignee: Kabushiki Kaisha Komatsu Seisakusho, Tokyo, Japan

[21] Appl. No.: 14,215

[22] Filed: Feb. 22, 1979

[30] Foreign Application Priority Data

Feb. 22, 1978 [JP] Japan .................................. 53-20733

[51] Int. Cl.² .............................................. F15B 21/04
[52] U.S. Cl. ................................... 60/456; 60/DIG. 5; 188/264 D
[58] Field of Search .................. 60/456, 329, DIG. 5; 188/264 AA, 264 D, 264 F

[56] References Cited

U.S. PATENT DOCUMENTS

| 2,306,379 | 12/1942 | Conradson | 60/329 |
| 3,917,037 | 11/1975 | Prillinger | 188/170 |

*Primary Examiner*—Edgar W. Geoghegan
*Attorney, Agent, or Firm*—Armstrong, Nikaido, Marmelstein, & Kubovcik

[57] ABSTRACT

A hydraulic circuit for steering and front brake system of a vehicle wherein discharged hydraulic fluid from steering cylinders is utilized for cooling front disc brakes. The circuit comprises a conventional steering circuit including a pair of steering cylinders and a steering valve having a drain circuit connected therewith, the pair of steering cylinders being operatively connected with the steering valve, and a pair of disc brakes for front wheels wherein the disc brakes are connected with the drain circuit of the steering valve.

1 Claim, 1 Drawing Figure

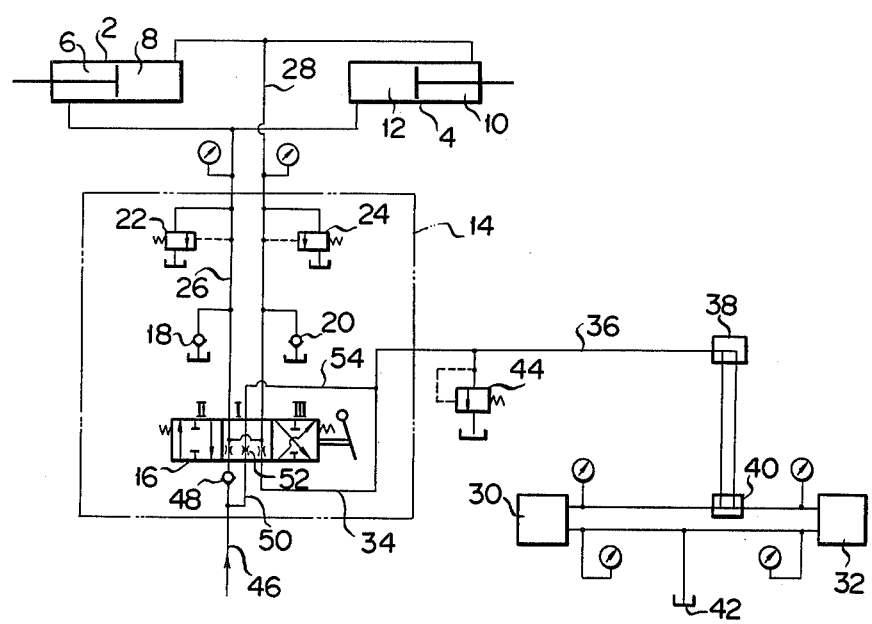

HYDRAULIC CIRCUIT FOR STEERING AND FRONT BRAKE SYSTEM

BACKGROUND OF THE INVENTION

This invention relates to a hydraulic circuit for steering and front brake system of a vehicle such as a dump truck or the like.

A common form of vehicle brake systems employs drum brakes for front wheels while disc brakes are usually used for rear wheels, which disc brakes also function as a retarder. In recent years, however, vehicles equipped with fluid actuated disc brakes for front wheels as well as for rear wheels have been introduced in order to produce more powerful and accurate braking action. Installment of such disc brakes for front wheels requires additional pump means, valves or other hydraulic means for cooling the disc brakes, which results in an expensive construction.

SUMMARY OF THE INVENTION

It is therefore an object of the present invention to provide a hydraulic circuit for steering and front brake system of a vehicle which requires no additional hydraulic means for cooling the front brake system.

Another object of the present invention is to provide a hydraulic circuit for steering and front brake system of a vehicle wherein the hydraulic circuit can be obtained by using a conventional hydraulic circuit for steering with a little modification thereto.

In accordance with an aspect of the present invention, there is provided a hydraulic circuit for steering and front brake system of a vehicle comprising a pair of steering cylinders, steering valve means having a drain circuit connected therewith, said pair of steering cylinders being operatively connected with said steering valve means, and a pair of disc brakes for front wheels each having a cooling chamber formed therein wherein the cooling chambers of said disc brakes are connected with the drain cirucit of said steering valve means thereby introducing discharge hydraulic fluid from said steering cylinders into the cooling chambers of said disc brakes.

Since the discharged fluid from the steering cylinders is introduced into the cooling chambers of the front disc brakes by simply connecting the cooling chambers with the drain circuit of the steering valve, no special hydraulic component parts are requried for cooling the disc brakes. Therefore the feature of the present invention resides in the fact that the cooling chambers are connected with the drain circuit of a conventional steering valve.

The above and other objects and advantages of the present invention will be readily apparent from the following description taken in conjunction with the accompanying drawing.

BRIEF DESCRIPTION OF THE DRAWING

The drawing shows a hydraulic circuit for steering and front brake system of a vehicle according to the present invention.

DESCRIPTION OF THE INVENTION

The present invention will now be described in detail with reference to the accompanying drawing.

Reference numeral 2 denotes a left side steering cylinder having a rod-side chamber 6 and a cylinder bottom chamber 8 defined therein, and 4 a right side steering cylinder having a rod-side chamber 10 and a cylinder bottom chamber 12 defined therein.

Reference numeral 14 represents a steering valve means comprising a selector valve 16, a pair of check valves 18, 20 and a pair of relief valves 22, 24.

The selector valve 16 has three positions, namely, a neutral position I, a first offset position or left turn steering position II, and a second offset position or right turn steering position III. the rod-side chamber 6 of the left side steering cylinder 2 and the cylinder bottom chamber 12 of the right side steering cylinder 4 are connected in parallel with the selector valve 16 via a conduit 26, while the cylinder bottom chamber 8 of the left side steering cylinder 2 and the rod-side chamber 10 of the right side steering cylinder 4 are connected in parallel with the selector valve 16 via a conduit 28.

Reference numerals 30 and 32 denote disc brakes for front wheels each having brake cooling chamber formed therein. Each cooling chamber of the disc brakes 30, 32 is connected with a drain circuit 34 of the selector valve 16 and therefore of the steering valve means 14 via a conduit 36. The conduit 36 is bifurcated between couplings 38 and 40 for cooling the hydraulic oil passing therethrough.

Outlet ports of the brake cooling chambers of the disc brakes 30 and 32 are connected with a tank 42 via a cooler not shown. Reference numeral 44 denotes a relief valve provided in the conduit 36.

When the selector valve 16 remains at the neutral position I, hydraulic oil supplied from another hydraulic circuit (not shown) is introduced into the selector valve 16 through a conduit 46 and a check valve 48. Since the conduits 26 and 28 are communicated with each other when the selector valve 16 is at the neutral position I, hydraulic oil from the selector valve 16 is equally supplied into both chambers of the each steering cylinders 2 and 4, thus providing a straight-run operation of the vehicle.

At the same time, the hydraulic oil is supplied into the cooling chambers of the disc brakes 30, 32 via a conduit 50, a restriction 52, the drain circuit 34 including a conduit 54, and the conduit 36.

When the selector valve 16 is changed over to the first offset position II, the hydraulic oil is supplied into the rod-side chamber 6 of the left side steering cylinder 2 and the cylinder bottom chamber 12 of the right side steering cylinder 4 thereby turning the vehicle to the left. The discharged fluid from the steering cylinders 2 and 4 is at the same time returned to the selector valve 16 via the conduit 28 and is then discharged into the drain circuit 34. Since the disc brakes 30, 32 are connected with the drain circuit 34 through the conduit 36, the discharged fluid from the steering cylinders 2 and 4 is supplied into the cooling chambers of the disc brakes 30 and 32 for cooling the same.

Similarly when the selector valve 16 is changed over to the second offset position III, the hydraulic oil is supplied into the chambers 8 and 10 through the conduit 28 thereby turning the vehicle to the right. At the same time, the discharged fluid from the steering cylinders 2 and 4 is introduced into the cooling chambers of the disc brakes 30 and 32 through the conduit 26, the selector valve 16, the drain circuit 34 and the conduit 36.

As described hereinabove, according to the present invention by simply connecting the cooling chambers of the disc brakes 30, 32 with the drain circuit 34 of the steering valve means 14, the hydraulic oil is supplied into the cooling chambers of the disc brakes 30, 32 in any operating condition without using any additional hydraulic means, such as pumps, etc.

What I claim is:

1. A hydraulic circuit for steering and front brake system of a vehicle comprising a pair of steering cylinders, steering valve means having a drain circuit connected therewith, said pair of steering cylinders being operatively connected with said steering valve means, and a pair of disc brakes for front wheels each having a cooling chamber formed therein wherein the cooling chambers of said disc brakes are connected with the drain circuit of said steering valve means thereby introducing discharged hydraulic fluid from said steering cylinders into the cooling chambers of said disc brakes.

* * * * *